(12) United States Patent
Tanimoto et al.

(10) Patent No.: US 7,142,528 B2
(45) Date of Patent: Nov. 28, 2006

(54) MOBILE COMMUNICATION SYSTEM, GATEWAY EXCHANGE SELECTION SERVER AND GATEWAY EXCHANGE SELECTION METHOD

(75) Inventors: Shigeo Tanimoto, Yokosuka (JP); Fumiaki Ishino, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 1032 days.

(21) Appl. No.: 10/113,288

(22) Filed: Apr. 2, 2002

(65) Prior Publication Data

US 2002/0159421 A1 Oct. 31, 2002

(30) Foreign Application Priority Data

Apr. 3, 2001 (JP) ............................. 2001-104365

(51) Int. Cl.
*H04Q 7/24* (2006.01)

(52) U.S. Cl. ........................................ 370/338; 370/401
(58) Field of Classification Search ...................... None
See application file for complete search history.

(56) References Cited

U.S. PATENT DOCUMENTS

| | | | |
|---|---|---|---|
| 4,999,829 A | 3/1991 | Fite, Jr. et al. | |
| 5,930,348 A | 7/1999 | Regnier et al. | |
| 6,154,461 A * | 11/2000 | Sturniolo et al. | 370/401 |
| 6,459,783 B1 * | 10/2002 | March et al. | 379/211.02 |
| 6,493,341 B1 * | 12/2002 | Datta et al. | 370/392 |
| 6,584,110 B1 * | 6/2003 | Mizuta et al. | 370/401 |
| 6,735,187 B1 * | 5/2004 | Helander et al. | 370/338 |
| 2001/0032232 A1 * | 10/2001 | Zombek et al. | 709/201 |
| 2001/0034791 A1 * | 10/2001 | Clubb et al. | 709/238 |
| 2002/0052968 A1 * | 5/2002 | Bonefas et al. | 709/231 |

FOREIGN PATENT DOCUMENTS

| | | |
|---|---|---|
| EP | 0 973 300 | 1/2000 |
| JP | 7-105111 | 4/1995 |
| WO | WO 98/36543 | 8/1998 |
| WO | WO 01/26390 | 4/2001 |

* cited by examiner

*Primary Examiner*—Bob A. Phunkulh
(74) *Attorney, Agent, or Firm*—Oblon, Spivak, McClelland, Maier & Neustadt, P.C.

(57) ABSTRACT

A mobile communication system including a subscriber exchange 130, an information providing server 150, a plurality of gateway exchanges (#0) 140, (#1) 141 and a gateway exchange selection server 170 is provided, in which transmission paths connecting the subscriber exchange 130 and the information providing server 150 via the gateway exchanges (#0) 140 and (#1) 141 are established. The gateway exchange selection server selects a gateway exchange according to the state of the transmission paths. The subscriber exchange 130 establish a path to the selected gateway exchange.

18 Claims, 12 Drawing Sheets

MOBILE COMMUNICATION SYSTEM, GATEWAY EXCHANGE SELECTION SERVER AND GATEWAY EXCHANGE SELECTION METHOD

BACKGROUND OF THE INVENTION

1. Field of the Invention

The present invention relates to a mobile communication system including an information providing server which provides information to a mobile station via a gateway exchange and a subscriber exchange, and relates to a gateway exchange selection server and a gateway exchange selection method in the mobile communication system.

2. Description of the Related Art

Recently, services for providing information such as information on the Internet to a mobile station become widespread. FIG. 1 shows a configuration example of a conventional mobile communication system for realizing an information providing service. In the figure, the mobile station 510 can obtain various information in an ISP server 550, which is an information providing server, and can obtain various information on the Internet 560 which is connected to the ISP server 550 by accessing the ISP server 550 via a wireless access network (NW) 520, a subscriber exchange 530 and a gateway exchange 540.

However, in the above-mentioned conventional mobile communication system, there is only one transmission line reaching from the subscriber exchange 530 to the ISP server 550 via the gateway exchange 540. Therefore, when a failure occurs on the transmission line, the mobile station 510 can not obtain information until the transmission line recovers from the failure.

Thus, an mobile communication system is required in which the mobile station 510 can obtain information even when a failure occurs on the transmission line connecting the subscriber exchange 530 to the ISP server 550 via the gateway exchange 540.

SUMMARY OF THE INVENTION

An object of the present invention is to provide a mobile communication system, a gateway exchange selection server and a gateway exchange selection method which allow the mobile station to obtain information even when a failure occurs on the transmission line reaching from the subscriber exchange to the information providing server via the gateway exchange.

The above object is achieved by a mobile communication system comprising:

a subscriber exchange to which a mobile station is connected;

an information providing server which provides information to the mobile station;

a plurality of gateway exchanges on transmission paths between the subscriber exchange and the information providing server;

a gateway exchange selection server;

the gateway exchange selection server comprising:

a gateway exchange selection part for selecting an gateway exchange used for communication between the mobile station and the information providing server;

a gateway exchange selection result notification part for notifying the subscriber exchange of a result of selection performed by the gateway exchange selection part;

the subscriber exchange comprising:

a communication path establishing part for establishing a communication path between the subscriber exchange and a gateway exchange which is selected by the gateway exchange selection part; and wherein communication between the mobile station and the information providing server is performed via the gateway exchange selected by the gateway exchange selection part.

According to this mobile communication system, a communication path can be established according to states of a plurality of transmission paths connecting the subscriber exchange and the information providing server via the gateway exchanges. Therefore, even when a failure occurs in the transmission paths, the mobile station can obtain information.

From the same viewpoint, in the mobile communication system, the gateway exchange selection server may include:

a failure detection part for detecting a failure on the transmission path connecting the subscriber exchange and the information providing server via the gateway exchange;

wherein the gateway exchange selection part selects a gateway exchange other than a gateway exchange on a transmission path on which the failure is detected.

In addition, the gateway exchange selection server may include:

a gateway exchange selection ratio setting part for setting a selection ratio for the gateway exchanges;

wherein the gateway exchange selection part selects the gateway exchange according to the selection ratio.

According to this mobile communication system, by setting the selection ratio appropriately, the gateway exchanges can be selected while keeping the balance, so that as possible as many calls can be connected. In addition, retry of establishment of communication path at the time of occurrence of failure can be decreased, and communication quality can be improved and load on the system can be decreased.

From the same viewpoint, the selection ratio may be a ratio of communication available capacities of the gateway exchanges. In addition, the selection ratio is a ratio of differences each of which may be a difference between a communication available capacity and a communication capacity in use for a gateway exchange.

In addition, a gateway exchange selection server and a gateway exchange selection method are provided.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
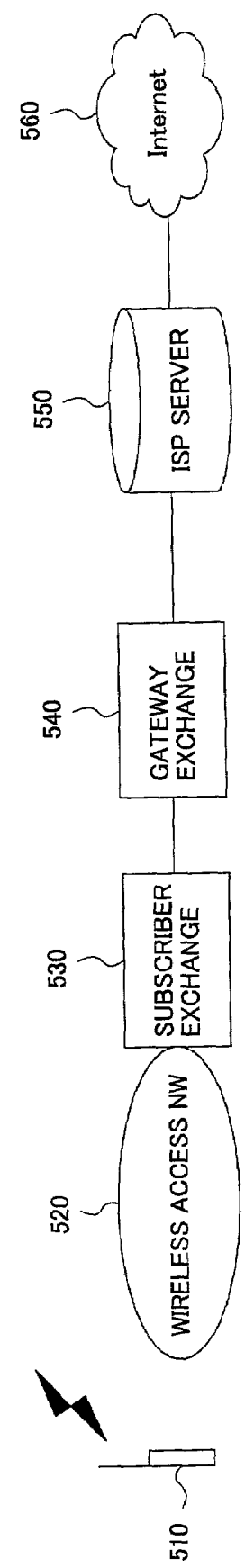
FIG. 1 shows a configuration example of a conventional mobile communication system for realizing a information providing service.
Figure 2:
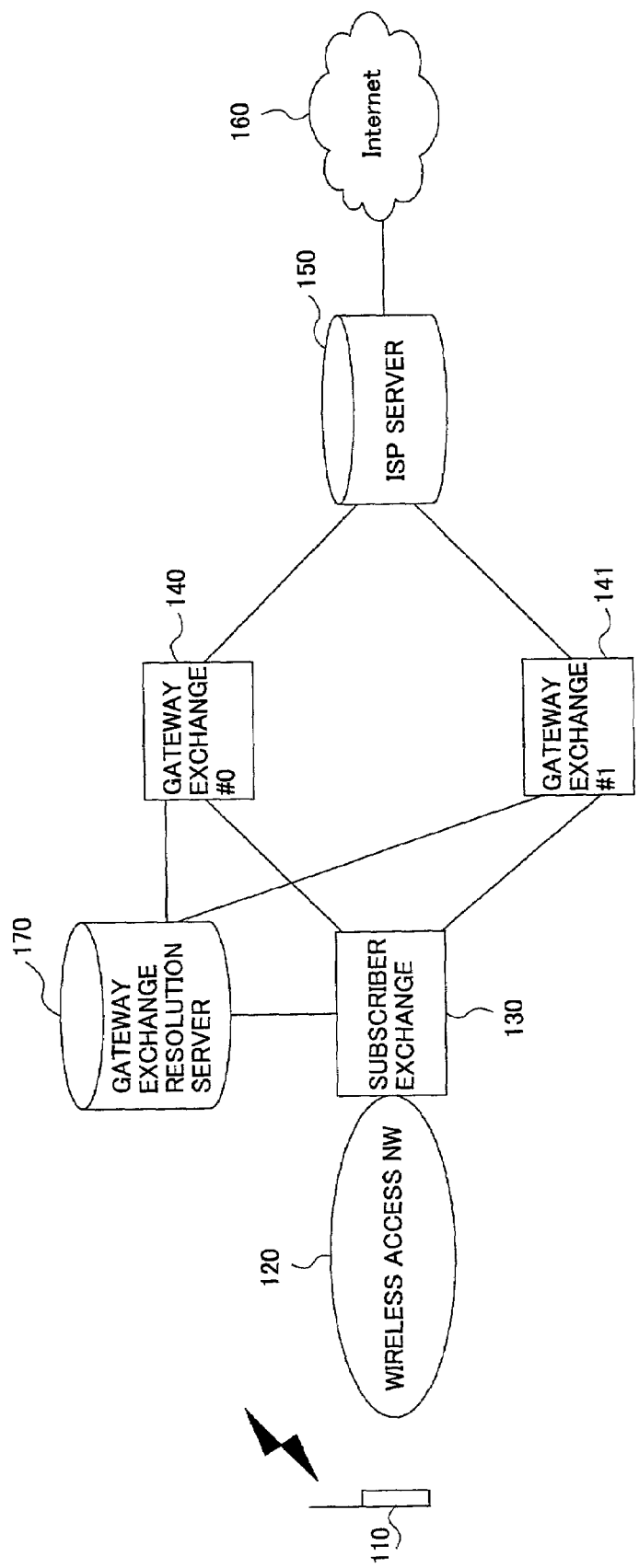
FIG. 2 shows a block diagram of an example of a mobile communication system according to an embodiment of the present invention.

In the following, embodiments of the present invention will be described with reference to figures. FIG. 2 shows a block diagram of an example of a mobile communication system according to an embodiment of the present invention.

In the figure, a mobile station 110 accesses an ISP server 150 which is an information providing server via a wireless access network (NW) 120, a subscriber exchange 130, and a gateway exchange (#0) 140 or a gateway exchange (#1) 141 so that the mobile station 110 can obtain various information in the ISP server 150 and various information on the Internet connected to the ISP server 150.

In this mobile communication system, two transmission lines are provided by providing the gateway exchange (#0) 140 and the gateway exchange (#1) 141. One transmission line (or transmission path) reaches from the subscriber exchange 130 to the ISP server 150 via the gateway exchange (#0) 140, and another transmission line reaches from the subscriber exchange 130 to the ISP server 150 via the gateway exchange (#1) 141. That is, the transmission lines between the subscriber exchange 130 and the ISP server 150 are redundant. In this embodiment, the gateway exchanges (#0) 140 and (#1) 141 are connected with the ISP server 150 by dedicated lines.

A gateway exchange resolution server 170 as a gateway exchange selection server selects a gateway exchange used for communication between the mobile station 110 and the ISP server 150. The result of the selection of the gateway exchange is sent to the subscriber exchange 130. The subscriber exchange 130 establishes a communication path to the selected gateway exchange and sends a signal from the mobile station to the communication path.

When the gateway exchange resolution server 170 recognizes a failure on a transmission line between the subscriber exchange 130 and the ISP server 150, the gateway exchange resolution server 170 selects a gateway exchange again according to information on the failure. The result of the selection of this gateway exchange is also sent to the subscriber exchange 130. The subscriber exchange 130 establishes a communication path to the selected gateway exchange. That is, the former selected communication path is switched to the newly selected communication path, and the mobile station 110 sends a signal to the communication path.

As for a selection method of the gateway exchange, there are a representative selection method, an asynchronous round robin method and an asynchronous round robin method. In the following operations of the mobile communication system for each selection method will be described.

Figure 3:
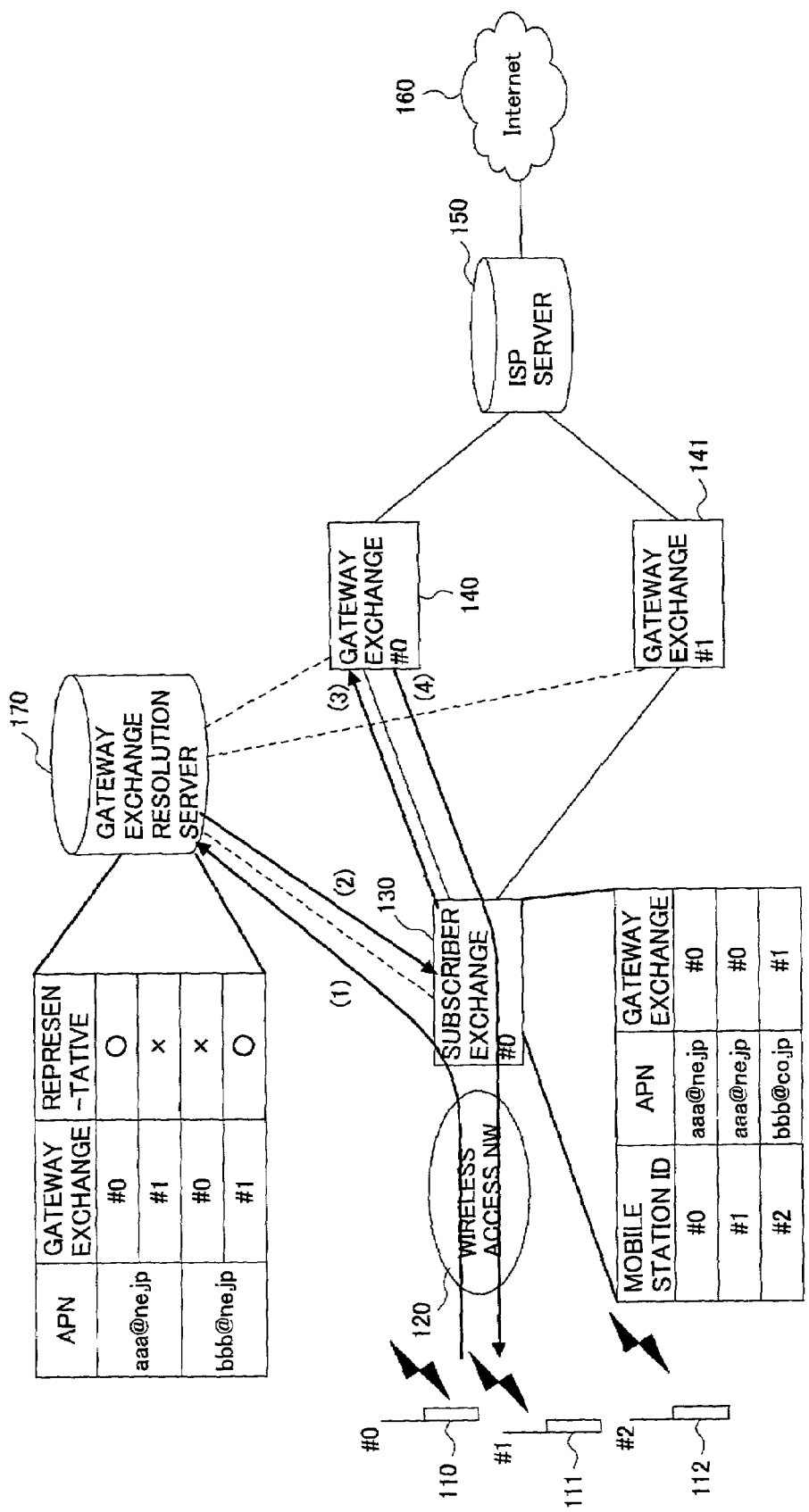
FIG. 3 shows an example of an origination procedure when the representative selection method is adopted.

First, the operation of the mobile communication system when the representative selection method is adopted will be described. FIG. 3 shows an example of an origination procedure when the representative selection method is adopted. The gateway exchange resolution server 170 selects a gateway exchange for each of servers including the ISP server 150 and the other servers (not shown in the figure). The ISP sever 150 and the other servers are specified by APN (Access Point Name). In this figure, the APN of the ISP server 150 is aaa@ne.jp and the APN for another server is bbb@co.jp.

The gateway exchange resolution server 170 selects the gateway exchange (#0) 140 for the ISP server 150, and selects the gateway exchange (#1) 141 for the other server. In the following, the selected gateway exchange in the representative selection method will be called a representative gateway exchange.

Each of a mobile station (#0) 110, a mobile station (#1) 111 and a mobile station (#2) 112 sends a predetermined signal. The predetermined signal includes APN of the ISP server or the other server (which will be called information providing servers) which becomes a communication partner. In this embodiment, since the mobile station (#0) 110 and the mobile station (#1) 111 communicate with the ISP server 150, the signal includes APN of the ISP server 150. Since the mobile station (#2) 112 communicates with the other server, the predetermined signal includes APN of the other server.

The predetermined signals sent from the mobile stations (#0) 110–(#2) 112 are sent to the gateway exchange resolution server 170 via the subscriber exchange (#0) 130 (step 1).

When the gateway exchange resolution server 170 receives the predetermined signals, it recognizes the information providing servers which are communication partners of the mobile stations (#0) 110–(#2) 112, and sends identifying information (exchange IDs) of a representative gateway exchange corresponding to the information providing servers to the subscriber exchange (#0) 130.

When the subscriber exchange (#0) 130 receives the exchange IDs of the representative gateway exchanges, the subscriber exchange (#0) 130 generates a profile including a mobile station ID, APN of the information providing server which is a communication partner of the mobile station and the exchange ID of the gateway exchange selected for the information providing server for each of the mobile stations (#0) 110–(#2) 112 (step 2).

For the mobile station (#0) 110, a profile including the mobile station ID (#0), APN of the ISP server 150 of the communication partner and an exchange ID (#0) of the representative gateway exchange (#0) 140 corresponding to the ISP server 150 associated with each other is generated. In the same way, for the mobile station (#1) 111, a profile including the mobile station ID (#1), APN of the ISP server 150 of the communication partner and exchange ID (#0) of the representative gateway exchange (#0) 140 corresponding to the ISP server 150 associated with each other is generated. In addition, for the mobile station (#2) 112, a profile including the mobile station ID (#2), APN of the other server of the communication partner and exchange ID (#1) of the representative gateway exchange (#1) 141 corresponding to the other server associated with each other is generated.

Next, the subscriber exchange (#0) 130 establishes paths between the subscriber exchange and the gateway exchange (#0) 140, and between the subscriber exchange and the gateway exchange (#1) 141 by using the profiles generated for the mobile stations (#0) 110–(#2) 112. In addition, the gateway exchange (#0) 140 and the gateway exchange (#1) 141 generates tables including mobile station IDs of the mobile stations (#0) 110–(#2) 112 and corresponding IP addresses assigned to the mobile stations (step 3).

In this embodiment, a path is established between the subscriber exchange (#0) 130 and the gateway exchange (#0) 140 for communication between the mobile stations (#0) 110, (#1) 111 and the ISP server 150, and a path is established between the subscriber exchange (#0) 130 and the gateway exchange (#1) 141 for communication between the mobile stations (#2) 112 and the other server. The gateway exchange (#0) 140 and the gateway exchange (#1) 141 may send all or a part of items of information in the generated table (mobile station IDs of the mobile stations (#0) 110–(#2) 112) and corresponding IP addresses assigned to the mobile stations) to the ISP server and the other server. In this case, the information is managed by the ISP server 150 and the other server.

When the path is established, the gateway exchange (#0) 140 and the gateway exchange (#1) 141 notify the mobile stations (#0) 110–(#2) 112 of it (step 4). According to these steps, communication between the mobile stations and the ISP server 150 or the other server becomes available.

Figure 4:
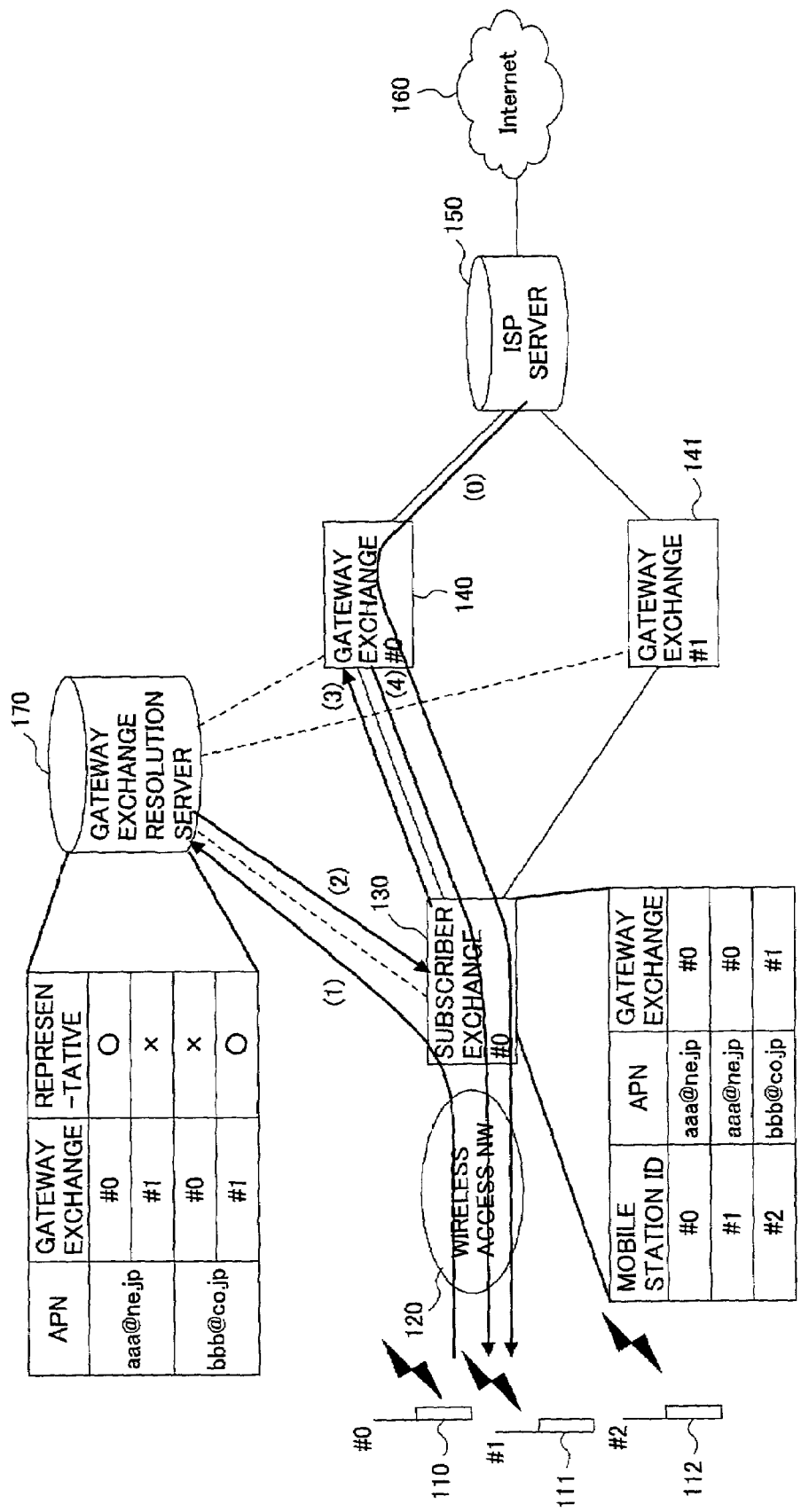
FIG. 4 shows an example of an incoming procedure when the representative selection method is adopted.

FIG. 4 shows an example of an incoming procedure when the representative selection method is adopted. The ISP server 150 sends a predetermined signal to the gateway exchange (#0) 140 when originating. The predetermined signal includes APN of the ISP server 150. The gateway exchange (#0) 140 sends the received predetermined signal to one of the mobile stations (#0) 110 and (#1) 111 which becomes the communication partner of the ISP server 150 via the subscriber exchange (#0) 130 (step 0).

The mobile station (#0) 110 or the mobile station (#1) 111 which received the predetermined signal sends a signal including APN which is included in the predetermined signal to the gateway exchange resolution server 170 via the subscriber exchange (#0) 130 (step 1). Operations of steps 2–4 hereinafter are the same as those of the steps 2–4 in the origination procedure shown in FIG. 3.

Since the representative gateway exchange is fixed, the subscriber exchange (#0) 130 may generate a profile including the mobile station ID, APN of an information providing server which becomes a communication partner of the mobile station and an exchange ID of a selected gateway exchange selected for the information providing server which are associated with each other. In this case, the steps 1 and 2, that is, request to the gateway exchange resolution server 170 from the subscriber exchange (#0) 130 and response from the gateway exchange resolution server 170 for the request are omitted.

Figure 5:
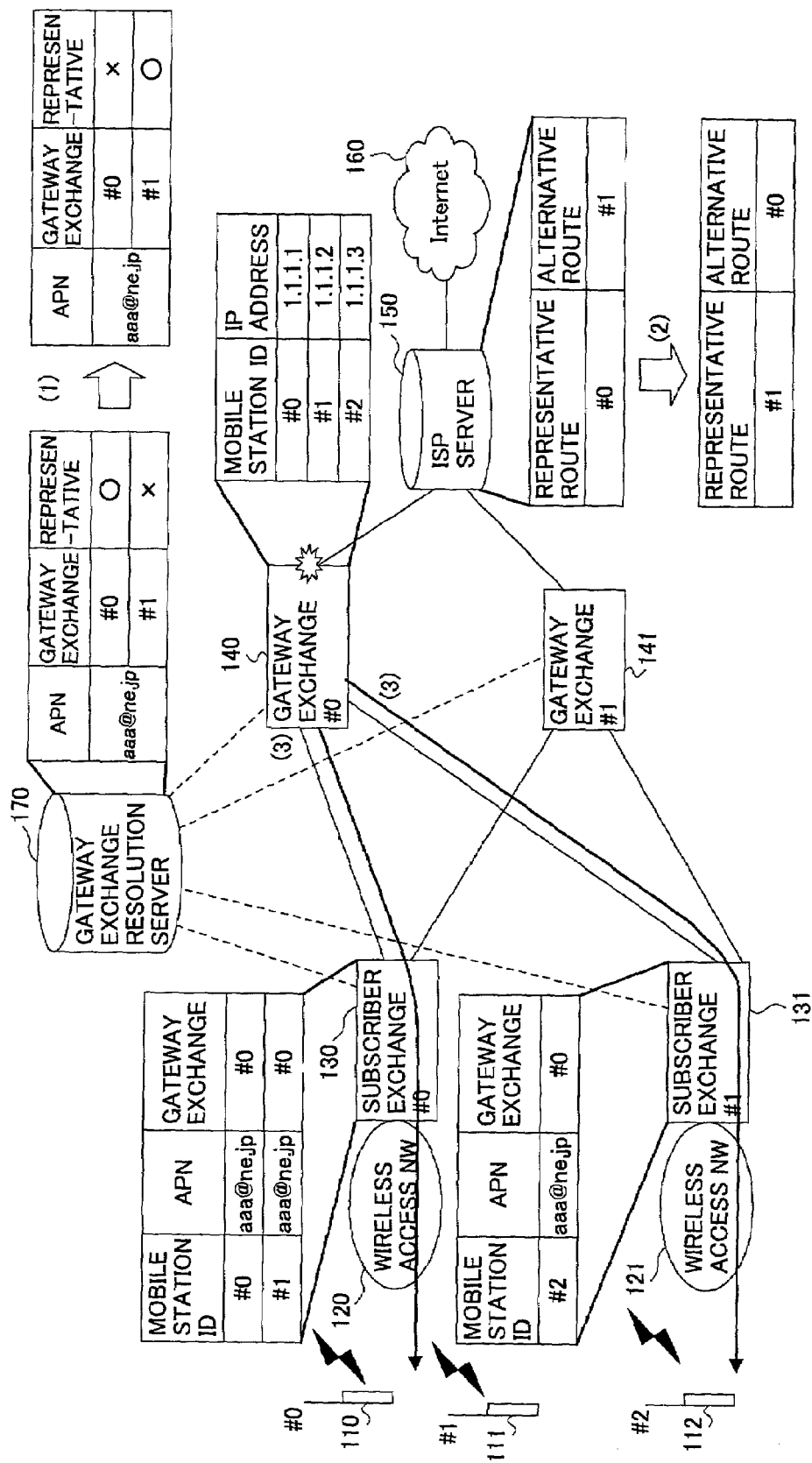
FIGS. 5 and 6 show an example of a procedure for switching a communication path when a failure occurs in the case when the representative selection method is adopted.
Figure 6:
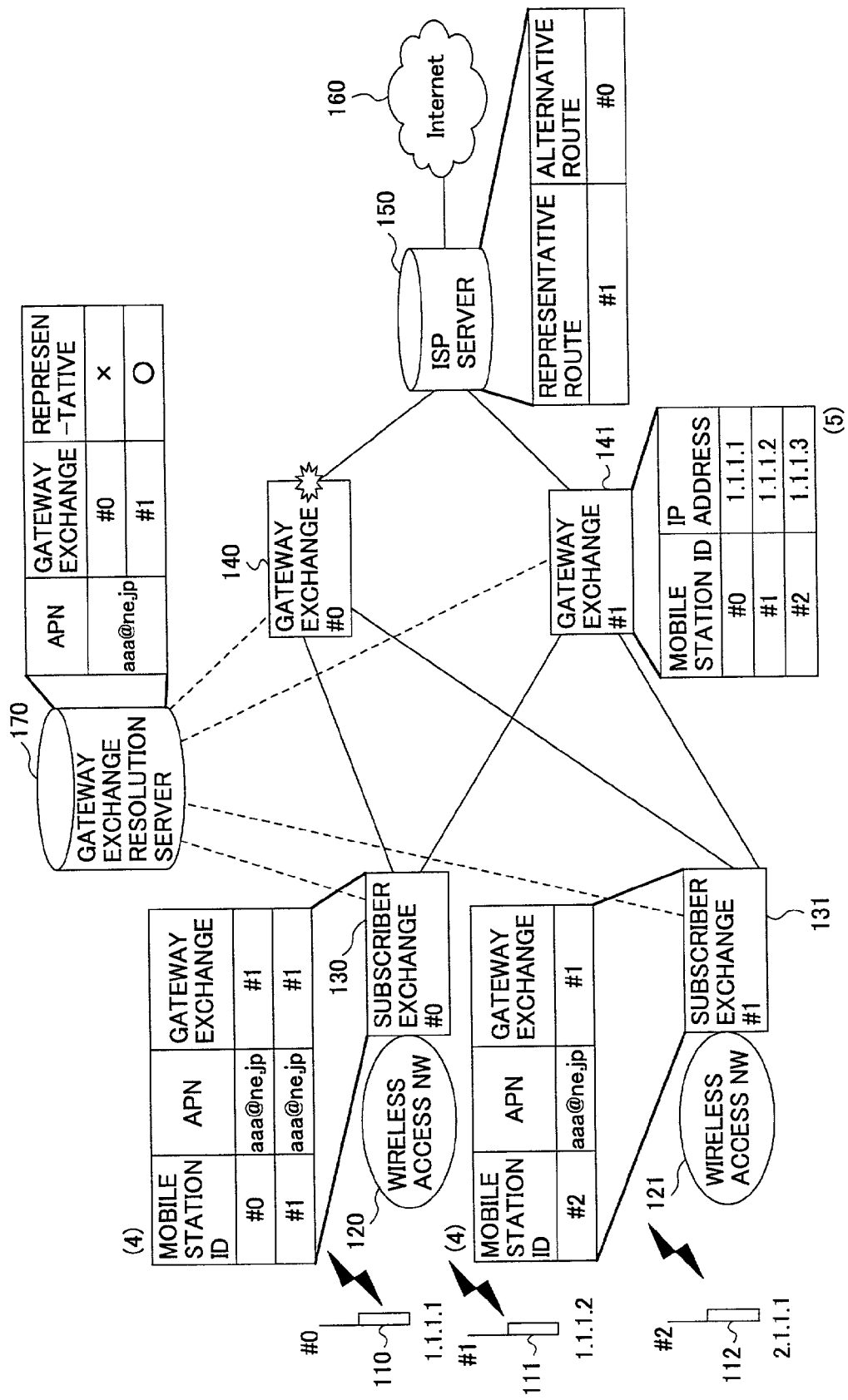

FIGS. 5 and 6 show an example of a procedure for switching a communication path when a failure occurs in the case when the representative selection method is adopted. In FIG. 5, a path is established between the subscriber exchange (#0) 130 and the gateway exchange (#0) 140 for communication between the mobile stations (#0) 110, (#1) 111 and the ISP server 150. The mobile stations (#0) 110 and (#1) 111 communicate with the ISP server 150 via a wireless access network 120, the subscriber exchange (#0) 130 and the gateway exchange (#0) 140.

In addition, a path is established between the subscriber exchange (#1) 131 and the gateway exchange (#0) 140 for communication between the mobile station (#2) 112 and the ISP server 150. The mobile station (#2) 112 communicates with the ISP server 150 via a wireless access network 121, the subscriber exchange (#1) 131 and the gateway exchange (#0) 140.

In this state, a case in which a failure occurs on a transmission line between the gateway exchange (#0) 140 and the ISP server 150 is considered, in which the transmission line includes the gateway exchange (#0) 140.

When the gateway exchange (#0) 140, the subscriber exchange (#0) 130 or the subscriber exchange (#1) 141 detects a failure in the transmission line between the gateway exchange (#0) 140 and the ISP server 150, the gateway exchange (#0) 140, the subscriber exchange (#0) 130 or the subscriber exchange (#1) 141 notifies the gateway exchange resolution server 170 of the failure. The gateway exchange resolution server 170 itself may detect the failure.

When the gateway exchange resolution server 170 recognizes the failure in the transmission line between the gateway exchange (#0) 140 and the ISP server 150 by the notification from the gateway exchange (#0) 140, the subscriber exchange (#0) 130 or the subscriber exchange (#1) 141 or by detection of the failure, the gateway exchange resolution server 170 changes the representative gateway exchange corresponding to the ISP server 150 from the gateway exchange (#0) 140 to the gateway exchange (#1) 141 (step 1).

Also in the ISP server 150, failure detection in the transmission line between the gateway exchange (#0) 140 and the ISP server 150 is performed. When the ISP server 150 detects the failure, it changes a communication route (representative route) used for communication between the mobile station (#0) 110 and the mobile station (#2) 112 from a communication route connected to the gateway exchange (#0) 140 to a communication route connected to the gateway exchange (#1) 141 (step 2).

After the gateway exchange resolution server 170 changes the representative gateway exchange (step 1), the gateway exchange resolution server 170 performs a process for disconnecting communication according to the failure. More concretely, when the failure occurs in the gateway exchange (#0) 140 itself, the gateway exchange resolution server 170 performs a process for disconnecting every communication which passes through the gateway exchange (#0) 140. When a failure occurs in the dedicated line connecting the gateway exchange (#0) 140 and the ISP server 150, the gateway exchange resolution server 170 performs a process for disconnecting communication between the mobile station and the ISP server 150, and keeps communication between the mobile station and the other server (which is not shown in the figure).

Next, the operation will be described with reference to FIG. 6. The gateway exchange resolution server 170 sends an exchange ID of the changed representative gateway exchange to the subscriber exchange (#0) 130 and the subscriber exchange (#1) 131.

When the subscriber exchange (#0) 130 receives the exchange ID of the gateway exchange, the subscriber exchange (#0) 130 changes the exchange ID of the gateway exchange in the profile corresponding to the mobile station (#0) 110 and the mobile station (#1) 111 (step 4). The exchange ID is changed to the exchange ID(#0) of the gateway exchange (#0) 140 to the exchange ID(#1) of the gateway exchange (#1) 141.

In the same way, when the subscriber exchange (#1) 131 receives the exchange ID of the gateway exchange, the subscriber exchange (#1) 131 changes the exchange ID of the gateway exchange in the profile corresponding to the mobile station (#2) 112 (step 4). The exchange ID is changed to the exchange ID(#0) of the gateway exchange (#0) 140 to the exchange ID(#1) of the gateway exchange (#1) 141.

Next, the subscriber exchange (#0) 130 and the subscriber exchange (#1) 131 establish a communication path to the gateway exchange (#1) 141 according to the profiles which were changed. According to the above operations, communication between each of the mobile stations (#0) 110–(#2) 112 and the ISP server 150 becomes possible again.

When the ISP server 150 manages the mobile station ID and the IP address assigned to the mobile station, the ISP server 150 sends the mobile station ID and the IP address assigned to the mobile station to the gateway exchange (#1) 141 after detecting a failure. When the ISP server 150 does not manage the mobile station ID and the IP address assigned to the mobile station, the gateway exchange (#0) 140 sends the mobile station ID and the IP address assigned to the mobile station to the gateway exchange (#1) 141. When the ISP server 150 manages only the mobile station ID, since it is necessary to assign IP address to the mobile station, the ISP server 150 may send a signal including the IP address assigned to the mobile station to the mobile station for setting the IP address again (step 5).

Figure 7:
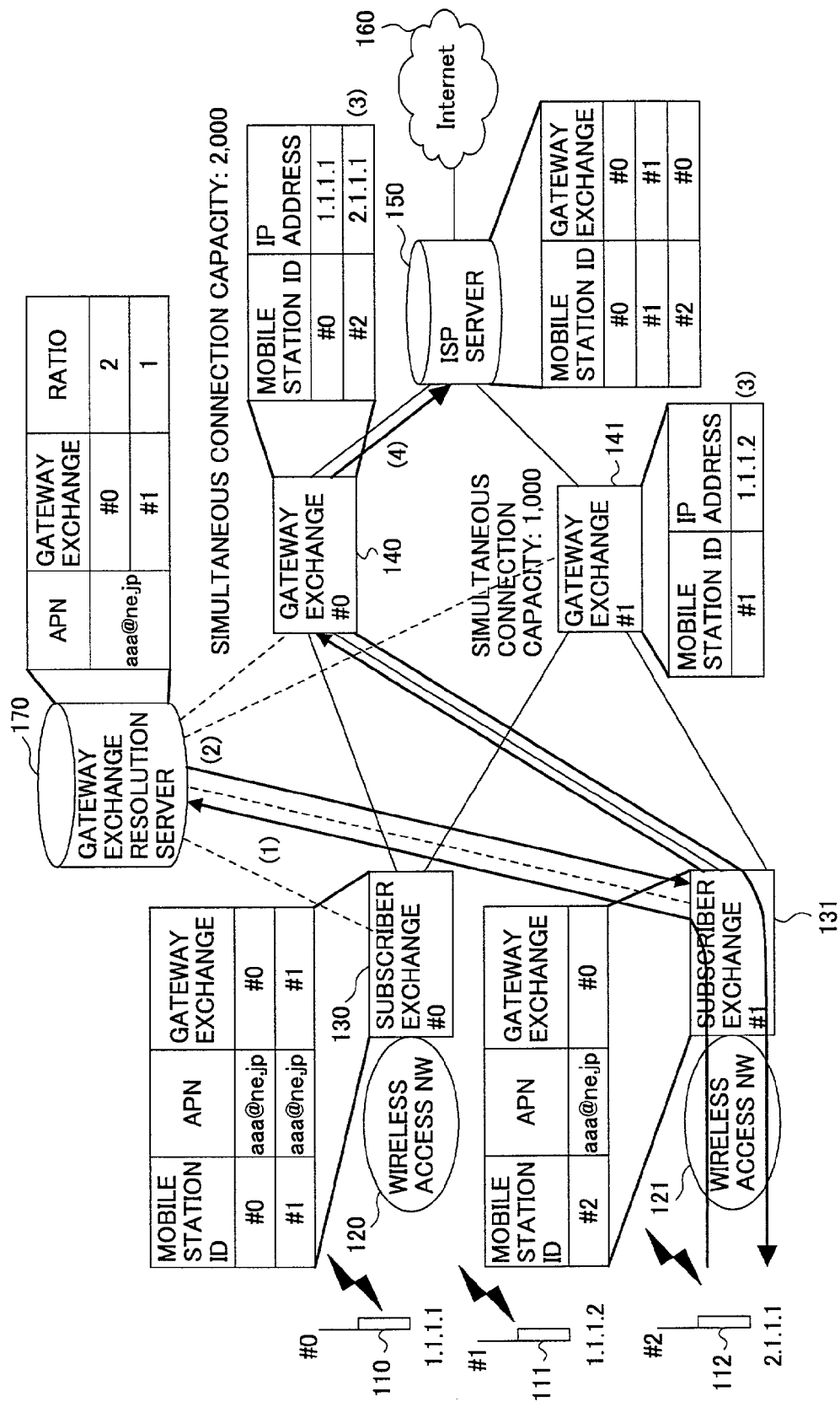
FIG. 7 shows an example of an origination procedure when the asynchronous round robin method is adopted.

Next, operation of the mobile communication system adopting the asynchronous round robin method will be described. FIG. 7 shows an example of an origination procedure when the asynchronous round robin method is adopted.

The gateway exchange resolution server 170 selects a gateway exchange for the ISP server 150 at a predetermined selection ratio. In this example, considering available communication capacity of the gateway exchange (#0) 140 (simultaneous connection capacity:2000) and available communication capacity of the gateway exchange (#1) 141 (simultaneous connection capacity:1000), the gateway exchange (#0) 140 and the gateway exchange (#1) 141 are selected at the selection ratio 2:1.

Each of the mobile stations (#0) 110–(#2) 112 sends a predetermined signal including APN of the ISP server 150 which becomes the communication partner. The predetermined signal sent from the mobile station (#0) 110 or (#1) 111 is sent to the gateway exchange resolution server 170 via the wireless access NW 120 and the subscriber exchange (#0) 130 (step 1). The predetermined signal sent from the mobile station (#2) 112 is sent to the gateway exchange resolution server 170 via the subscriber exchange (#1) 131 (step 1).

When the gateway exchange resolution server 170 receives the predetermined signal, the gateway exchange resolution server 170 recognizes that the information providing server which becomes the communication partner of the mobile station (#0) 110–(#2) 112 is the ISP server 150 from APN included in the signal, and sends identification information (exchange ID) of the gateway exchange for the ISP server 150 to the subscriber exchanges (#0) 130 and (#1) 131. Since the selection ratio between the gateway exchanges (#0) 140 and (#1) 141 is 2:1, the gateway exchange resolution server 170 sends an exchange ID of the gateway exchange (#0) 140 for the predetermined signal from the mobile station (#0) 110 or (#2) 112, and sends an exchange ID of the gateway exchange (#1) 141 for the predetermined signal from the mobile station (#1) 111.

When the subscriber exchange (#0) 130 receives the exchange ID of the gateway exchange, the subscriber exchange (#0) 130 generates profiles including mobile station ID, APN of the ISP server 150 which becomes the communication partner of the mobile station and exchange ID of the gateway exchange selected for the ISP server 150 which are associated with each other for the mobile stations (#0) 110 and (#1) 111 (step 2).

In the same way, when the subscriber exchange (#1) 131 receives the exchange ID of the gateway exchange, the subscriber exchange (#0) 130 generates a profile including mobile station ID, APN of the ISP server 150 which becomes the communication partner of the mobile station and exchange ID of the gateway exchange selected for the ISP server 150 which are associated with each other for the mobile station (#2) 112 (step 2).

Next, the subscriber exchange (#0) 130 establishes paths to the gateway exchange (#0) 140 and the gateway exchange (#1) 141 according to the generated profile. In the same way, the subscriber exchange (#1) 131 establishes a path to the gateway exchange (#0) 140 according to the generated profile.

The information on path settings is sent to the gateway exchanges (#0) 140 and (#1) 141. The gateway exchange (#0) 140 generates a table including mobile station IDs of the mobile stations (#0) 110 and (#1) 111 and IP addresses assigned to the mobile stations (#0) 110 and (#1) 111 in which the mobile station ID is associated with the IP address. In the same way, the gateway exchange (#1) 141 generates a table including mobile station ID of the mobile station (#2) 112 and an IP address assigned to the mobile station (#2) 112 on the basis of the information of the path establishment (step 3).

The gateway exchanges (#0) 140 and (#1) 141 may send all or a part of information of the table (association information on the mobile station IDs of the mobile stations (#0) 110–(#2) 112 and the IP addresses assigned to the mobile stations) to the ISP server 150 and the other server. In this case, the ISP server 150 and the other server manages the information.

When the number of the IP addresses assigned to the mobile stations reaches the available capacity for simultaneous connections, the gateway exchange (#0) 140 or (#1) 141 notifies the subscriber exchange (#0) 130 or (#1) 131 of it. The subscriber exchange (#0) 130 or (#1) 131 disconnects connection to the mobile station according to the notification, or, changes an exchange ID in the profile into an exchange ID of a gateway exchange for which the number of the IP addresses has not reached the available capacity, and establishes a path on the basis of the changed profile.

Next, the gateway exchanges (#0) 140 and (#1) 141 send the mobile station ID and the exchange ID of the gateway exchange selected for communication by the mobile station of the mobile station ID to the ISP server 150 (step 4). The ISP server 150 generates a table including the mobile station ID and an the exchange ID of the gateway exchange selected for communication by the mobile station of the mobile station ID on the basis of the received information.

In addition, when the path is established, the gateway exchanges (#0) 140 and (#1) 141 notify the mobile stations (#0) 110–(#2) 112 of it (step 5). According to these processes, communication between the mobile stations (#0) 110–(#2) 112 and the ISP servers.

Figure 8:
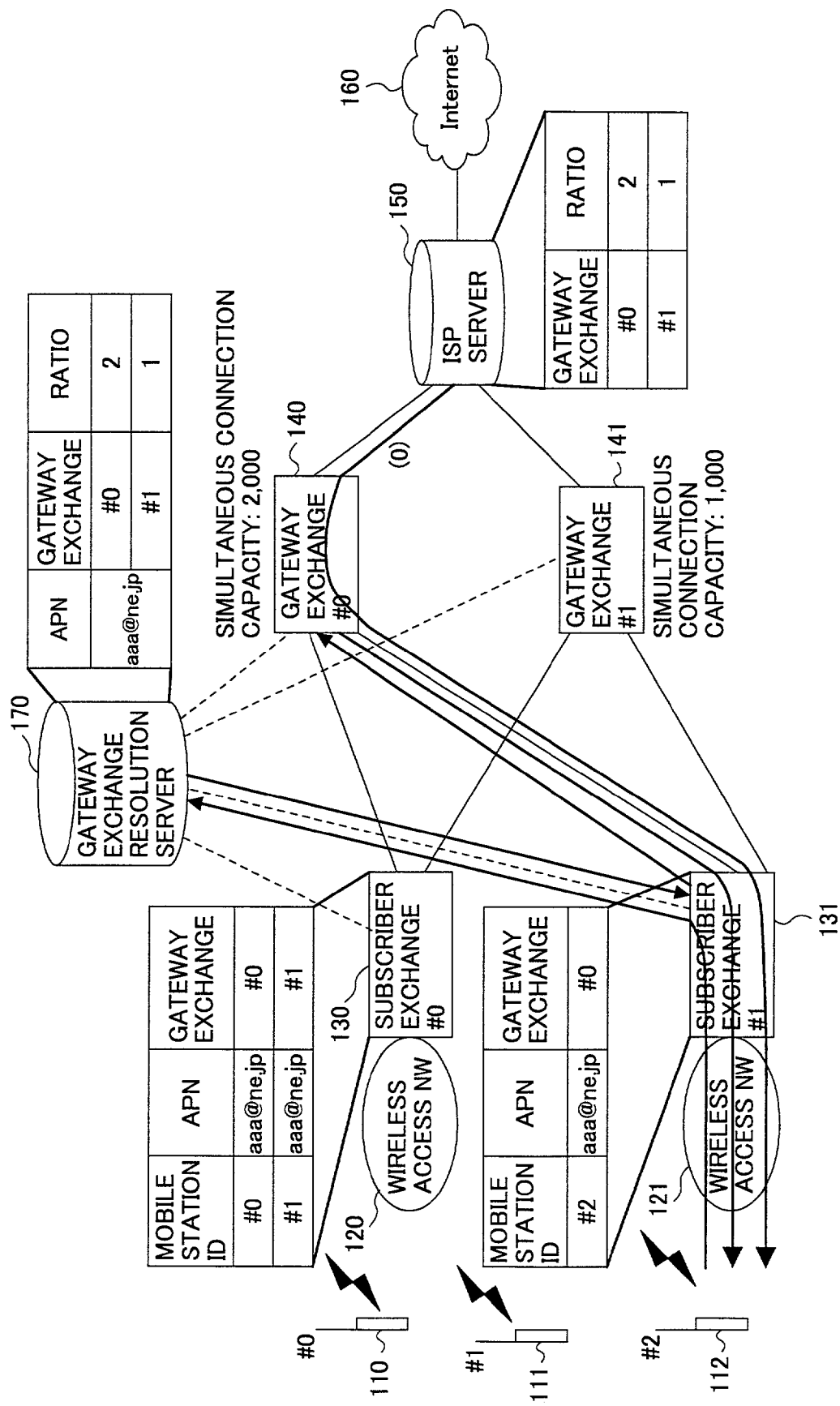
FIG. 8 shows an example of an incoming procedure when the asynchronous round robin method is adopted.

FIG. 8 shows an example of an incoming procedure when the asynchronous round robin method is adopted. The ISP server 150 sends a predetermined signal when originating a call (step 0) according to selection ratio 2:1 of the gateway exchange (#0) 140 and the gateway exchange (#1) 141 which are recognized beforehand. It is not necessary that the ISP server knows beforehand the selection ratio of the gateway exchanges (#0) 140 and (#1) 141 and sends the predetermined signal according to the selection ratio. Instead, the ISP server 150 may send the predetermined signal to the gateway exchange (#0) 140 and the gateway exchange (#1) 141 as necessary.

This predetermined signal includes APN of the ISP server 150. The gateway exchange (#0) 140 or (#1) 141 sends the received predetermined signal to one of the mobile stations (#0) 110–(#2) 112 which is a communication partner of the ISP server 150 via the subscriber exchange (#0) 130.

When the number of IP addresses which has been assigned to the mobile station reaches the number of capacity of simultaneous connections in the gateway exchange (#0) 140 or (#1) 141, the ISP server 150 autonomously selects another gateway exchange, and sends the predetermined signal to the selected gateway exchange.

The mobile station which received the predetermined signal sends a signal including APN included in the predetermined signal to the gateway exchange resolution server 170. Procedure hereinafter is the same as the steps 1–6 in the origination procedure shown in FIG. 7.

Figure 9:
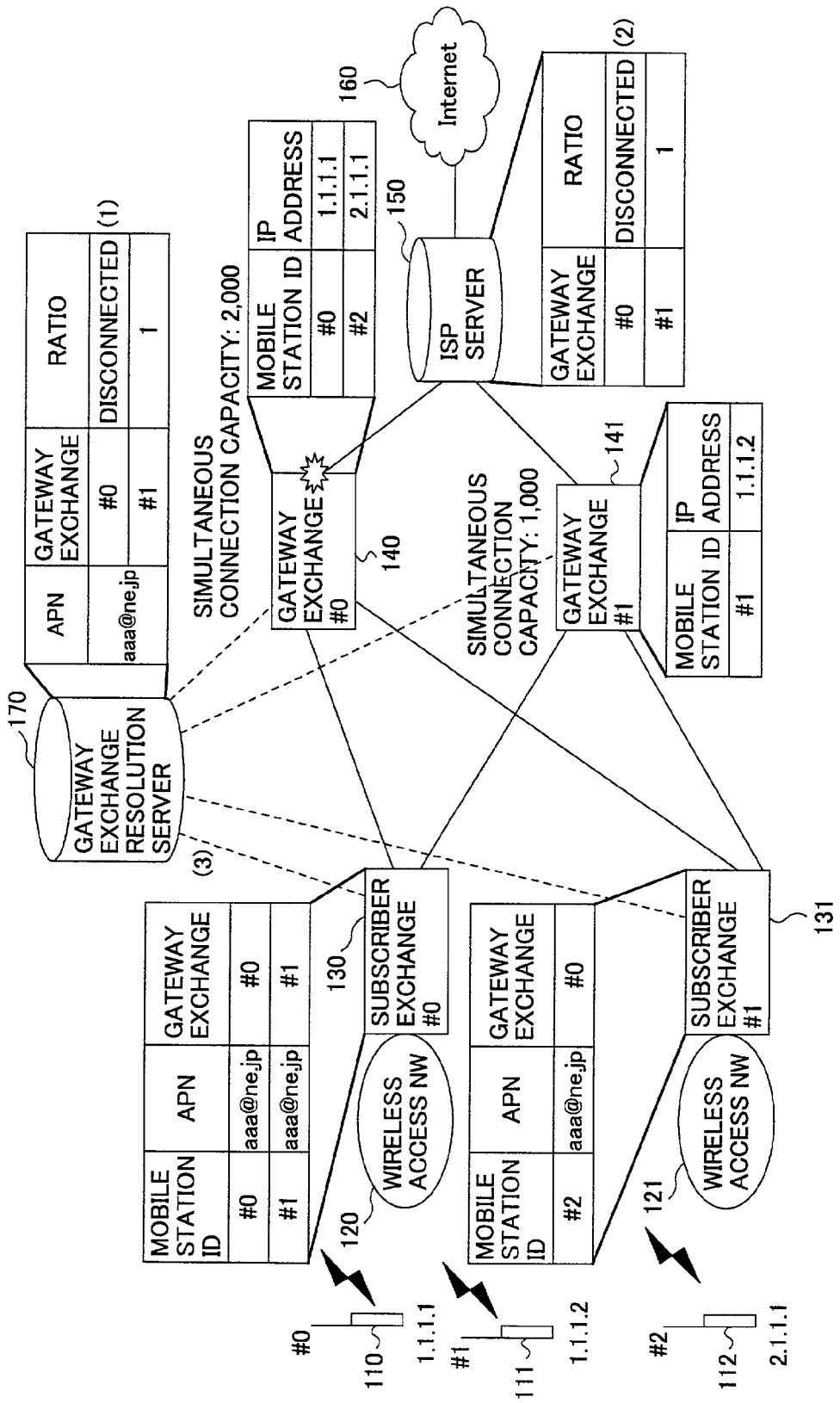
FIGS. 9 and 10 show an example of a procedure for switching a communication path when a failure occurs in the case when the asynchronous round robin method is adopted.
Figure 10:
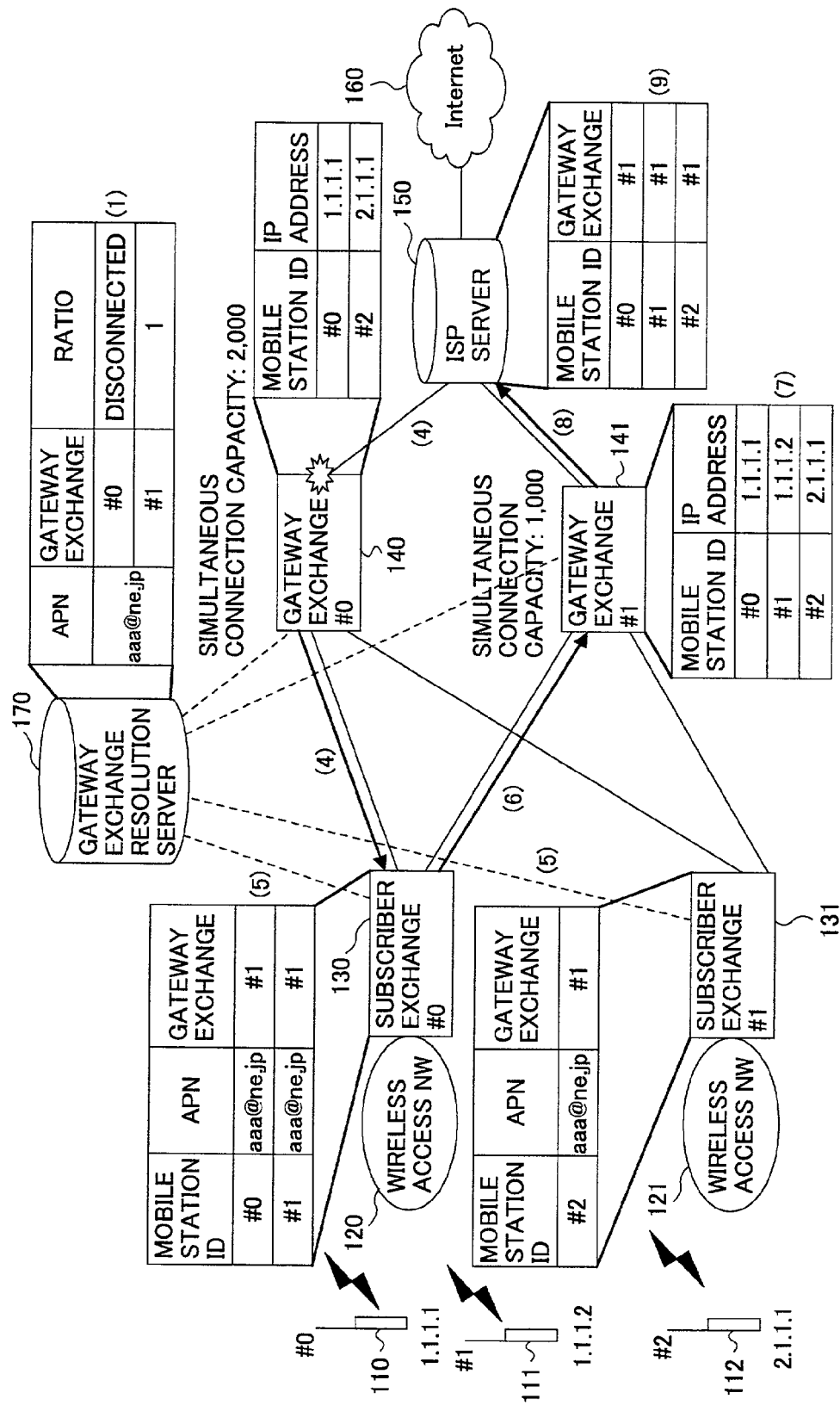

FIGS. 9 and 10 show an example of a procedure for communication path switching at the time of occurrence of failure when the asynchronous round robin method is adopted. In FIG. 9, a path is established between the subscriber exchange (#0) 130 and the gateway exchange (#0) 140 for communication between the mobile station (#0) 110 and the ISP server 150. In addition, a path is established between the subscriber exchange (#0) 130 and the gateway exchange (#1) 141 for communication between the mobile station (#1) 111 and the ISP server 150. The mobile station (#0) 110 communicates with the ISP server 150 via a wireless access network 120, the subscriber exchange (#0) 130 and the gateway exchange (#0) 140. In addition, the mobile station (#1) 111 communicates with the ISP server 150 via a wireless access network 120, the subscriber exchange (#0) 130 and the gateway exchange (#1) 141.

In addition, a path is established between the subscriber exchange (#1) 131 and the gateway exchange (#0) 140 for communication between the mobile station (#2) 112 and the ISP server 150. The mobile station (#2) 112 communicates with the ISP server 150 via a wireless access network 121, the subscriber exchange (#1) 131 and the gateway exchange (#0) 140.

In this state, a case in which a failure occurs on a transmission line between the gateway exchange (#0) 140 and the ISP server 150 is considered. In this embodiment, the transmission line includes the gateway exchange (#0) 140.

When the gateway exchange (#0) 140, the subscriber exchange (#0) 130 or the subscriber exchange (#1) 141 detects a failure in the transmission line between the gateway exchange (#0) 140 and the ISP server 150, the gateway exchange (#0) 140, the subscriber exchange (#0) 130 or the subscriber exchange (#1) 141 notifies the gateway exchange resolution server 170 of the failure. The gateway exchange resolution server 170 itself may detect the failure.

When the gateway exchange resolution server 170 recognizes the failure in the transmission line between the gateway exchange (#0) 140 and the ISP server 150 by the notification from the gateway exchange (#0) 140, the subscriber exchange (#0) 130 or the subscriber exchange (#1) 141 or by detection of itself, the gateway exchange resolution server 170 sets selection ratio between the gateway exchange (#0) 140 and the gateway exchange (#1) 141 as 0:1 (which means that the gateway exchange (#0) 140 can not be used for communication) (step 1).

Also in the ISP server 150, failure detection in the transmission line between the gateway exchange (#0) 140 and the ISP server 150 is performed. When the ISP server 150 detects the failure, the ISP server 150 sets selection ratio between the gateway exchange (#0) 140 and the gateway exchange (#1) 141 as 0:1 (which means that the gateway exchange (#0) 140 can not be used for communication) (step 2).

After the gateway exchange resolution server 170 changes the selection ratio of the gateway exchange (step 1), the gateway exchange resolution server 170 performs a process for disconnecting communication according to the failure. More concretely, when the failure occurs in the gateway exchange (#0) 140 itself, the gateway exchange resolution server 170 performs a process for disconnecting every communication which passes through the gateway exchange (#0) 140. When a failure occurs in the dedicated line connecting the gateway exchange (#0) 140 and the ISP server 150, the gateway exchange resolution server 170 performs a process for disconnecting communication between the mobile station and the ISP server 150, and keeps communication between the mobile station and the other server (which is not shown in the figure).

Next, the operation will be described with reference to FIG. 10. The gateway exchange resolution server 170 notifies the subscriber exchange (#0) 130 and the subscriber exchange (#1) 131 that the selection ratio between the gateway exchange (#0) 140 and the gateway exchange (#1) 141 was set to be 0:1 (step 4).

When the subscriber exchange (#0) 130 receives the notification, the subscriber exchange (#0) 130 changes the exchange ID of the gateway exchange in the profile corresponding to the mobile station (#0) 110 from the exchange ID(#0) of the gateway exchange (#0) 140 to the exchange ID(#1) of the gateway exchange (#1) 141 on the basis of the notification (step 5).

In the same way, when the subscriber exchange (#1) 131 receives the notification, the subscriber exchange (#1) 131 changes the exchange ID of the gateway exchange in the profile corresponding to the mobile station (#2) 112 from the exchange ID(#0) of the gateway exchange (#0) 140 to the exchange ID(#1) of the gateway exchange (#1) 141 on the basis of the notification (step 5).

Next, the subscriber exchange (#0) 130 and the subscriber exchange (#1) 131 establish communication path to the gateway exchange (#1) 141 according to the profiles which were changed (step 6).

The information on path settings is sent to the gateway exchange (#1) 141. The gateway exchange (#1) 141 generates a table including mobile station IDs of the mobile stations (#0) 110 and (#1) 111 and IP addresses assigned to the mobile stations (#0) 110 and (#1) 111 in which the mobile station ID is associated with the IP address.

When the ISP server 150 manages the mobile station ID and the IP address assigned to the mobile station, the ISP server 150 sends the mobile station ID and the IP address assigned to the mobile station to the gateway exchange (#1) 141 after detecting a failure. When the ISP server 150 does not manage the mobile station ID and the IP address assigned to the mobile station, the gateway exchange (#0) 140 sends the mobile station ID and the IP address assigned to the mobile station to the gateway exchange (#1) 141. When the ISP server 150 manages only the mobile station ID, since it is necessary to assign IP address to the mobile station, the ISP server 150 may send a signal including the IP address assigned to the mobile station to the mobile station for setting the IP address such that the IP address assigned to the mobile station is set again in the same way as the above-mentioned incoming procedure.

The gateway exchange (#0) 140 notifies the ISP server 150 of the mobile station ID and the exchange ID of the gateway exchange selected for communication by the mobile station corresponding to the mobile station ID (step 8). The ISP server 150 generates a table including the mobile station ID and the exchange ID of the gateway exchange selected for communication by the mobile station corresponding to the mobile station ID (step 9).

When the path is established, the gateway exchange (#0) 140 and the gateway exchange (#1) 141 notify the mobile stations (#0) 110–(#2) 112 of it. According to the above operations, communication between each of the mobile stations (#0) 110–(#2) 112 and the ISP server 150 becomes possible.

Figure 11:
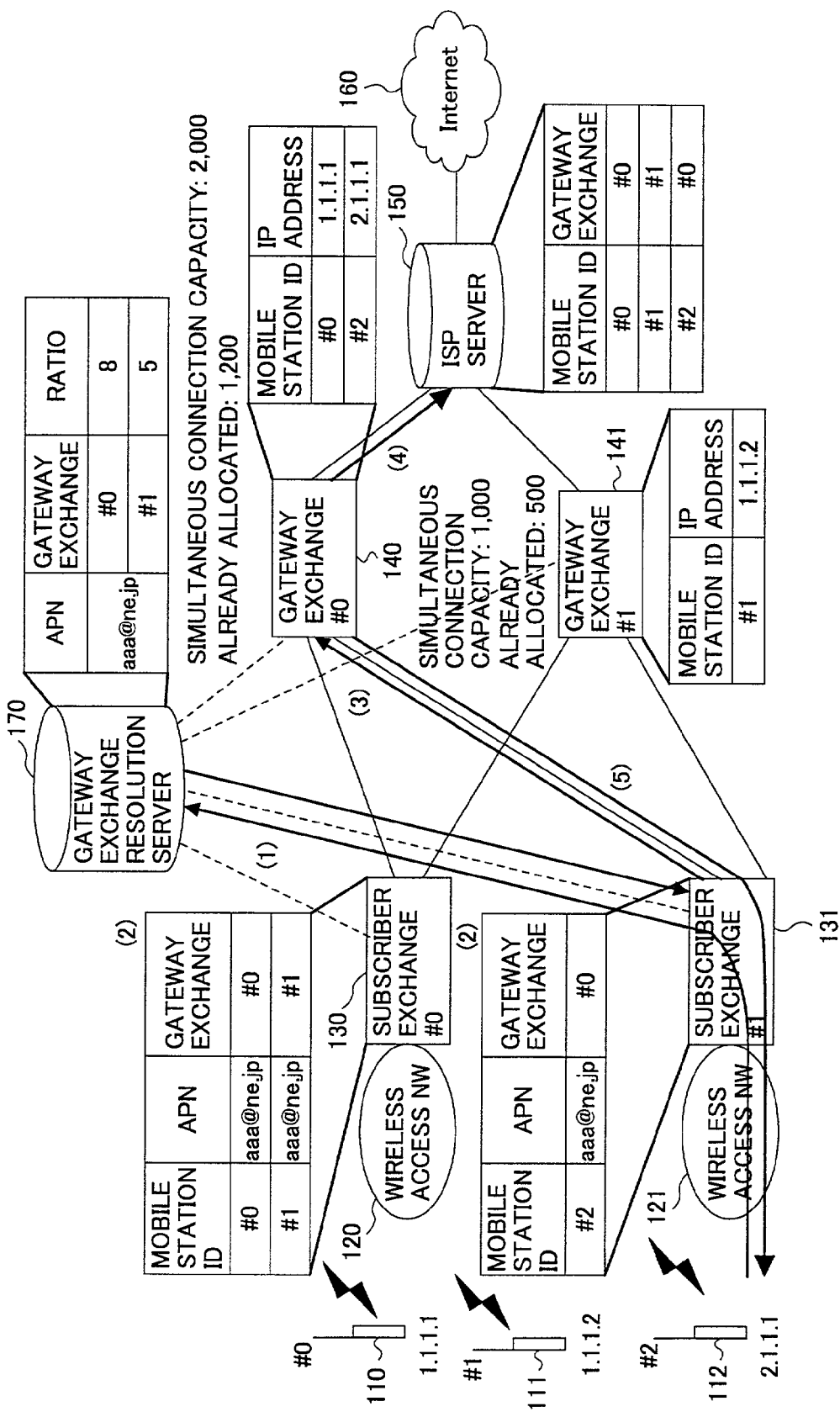
FIG. 11 shows an example of an origination procedure when the synchronous round robin method is adopted.

Next, the operation of the mobile communication system when adopting the synchronous round robin method will be described. FIG. 11 shows an example of an origination procedure when the synchronous round robin method is adopted.

The gateway exchange resolution server 170 selects a gateway exchange for the ISP server 150 at a predetermined selection ratio. In this example, considering difference (800) between the simultaneous connection capacity (2000) of the gateway exchange (#0) 140 and connection capacity (1200) which is already allocated, and difference (500) between the simultaneous connection capacity (1000) of the gateway exchange (#1) 141 and connection capacity (500) which is already allocated, the gateway exchange (#0) 140 and the gateway exchange (#1) 141 are selected at the selection ratio 8:5. The connection capacity which is already allocated is sent to the gateway exchange resolution server 170 from the gateway exchange (#0) 140 and the gateway exchange (#1) 141 as necessary.

When the difference between the simultaneous connection capacity and the connection capacity which is already allocated is 0, the gateway exchange resolution server 170 stops selection of the gateway exchange until allocation of connection capacity becomes available.

Each of the mobile stations (#0) 110–(#2) 112 sends a predetermined signal including APN of the ISP server 150 which becomes the communication partner. The predetermined signal sent from the mobile station (#0) 110 or (#1) 111 is sent to the gateway exchange resolution server 170 via the wireless access NW 120 and the subscriber exchange (#0) 130 (step 1). The predetermined signal sent from the mobile station (#2) 112 is sent to the gateway exchange resolution server 170 via the subscriber exchange (#1) 131 (step 1).

When the gateway exchange resolution server 170 receives the predetermined signal, the gateway exchange resolution server 170 recognizes that the information providing server which becomes the communication partner of the mobile station (#0) 110–(#2) 112 is the ISP server 150 from APN included in the signal, and sends identification information (exchange ID) of the gateway exchange for the ISP server 150 is sent to the subscriber exchanges (#0) 130 and (#1) 131. Since the selection ratio between the gateway exchanges (#0) 140 and (#1) 141 is 8:5, the gateway exchange resolution server 170 considers the selection ratio and sends an exchange ID of the gateway exchange (#0) 140 for the predetermined signal from the mobile station (#0) 110 or (#2) 112, and sends an exchange ID of the gateway exchange (#1) 141 for the predetermined signal from the mobile station (#1) 111.

When the subscriber exchange (#0) 130 receives the exchange ID of the gateway exchange, the subscriber exchange (#0) 130 generates profiles including mobile station ID, APN of the ISP server 150 which becomes the communication partner of the mobile station and exchange ID of the gateway exchange selected for the ISP server 150 which are associated with each other for the mobile stations (#0) 110 and (#1) 111 (step 2).

In the same way, when the subscriber exchange (#1) 131 receives the exchange ID of the gateway exchange, the subscriber exchange (#0) 131 generates profiles including mobile station ID, APN of the ISP server 150 which becomes the communication partner of the mobile station and exchange ID of the gateway exchange selected for the ISP server 150 which are associated with each other for the mobile station (#2) 112 (step 2).

Next, the subscriber exchange (#0) 130 establishes paths to the gateway exchange (#0) 140 and the gateway exchange (#1) 141 according to the generated profile. In the same way, the subscriber exchange (#1) 131 establishes a path to the gateway exchange (#0) 140 according to the generated profile.

The information on path settings is sent to the gateway exchanges (#0) 140 and (#1) 141. The gateway exchange (#0) 140 generates a table including mobile station IDs of the mobile stations (#0) 110 and (#1) 111 and IP addresses assigned to the mobile stations (#0) 110 and (#1) 111 in which the mobile station ID is associated with the IP address. In the same way, the gateway exchange (#1) 141 generates a table including mobile station ID of the mobile station (#2) 112 and an IP address assigned to the mobile station (#2) 112 on the basis of the information of the path establishment (step 3).

Next, the gateway exchanges (#0) 140 and (#1) 141 send the mobile station ID and the exchange ID of the gateway exchange selected for communication by the mobile station of the mobile station ID to the ISP server 150 (step 4). The ISP server 150 generates a table including the mobile station ID and the exchange ID of the gateway exchange selected for communication by the mobile station of the mobile station ID on the basis of the received information.

In addition, when the path is established, the gateway exchanges (#0) 140 and (#1) 141 notify the mobile stations (#0) 110–(#2) 112 of it (step 5). According to these processes, communication between the mobile stations (#0) 110–(#2) 112 and the ISP servers becomes available.

Figure 12:
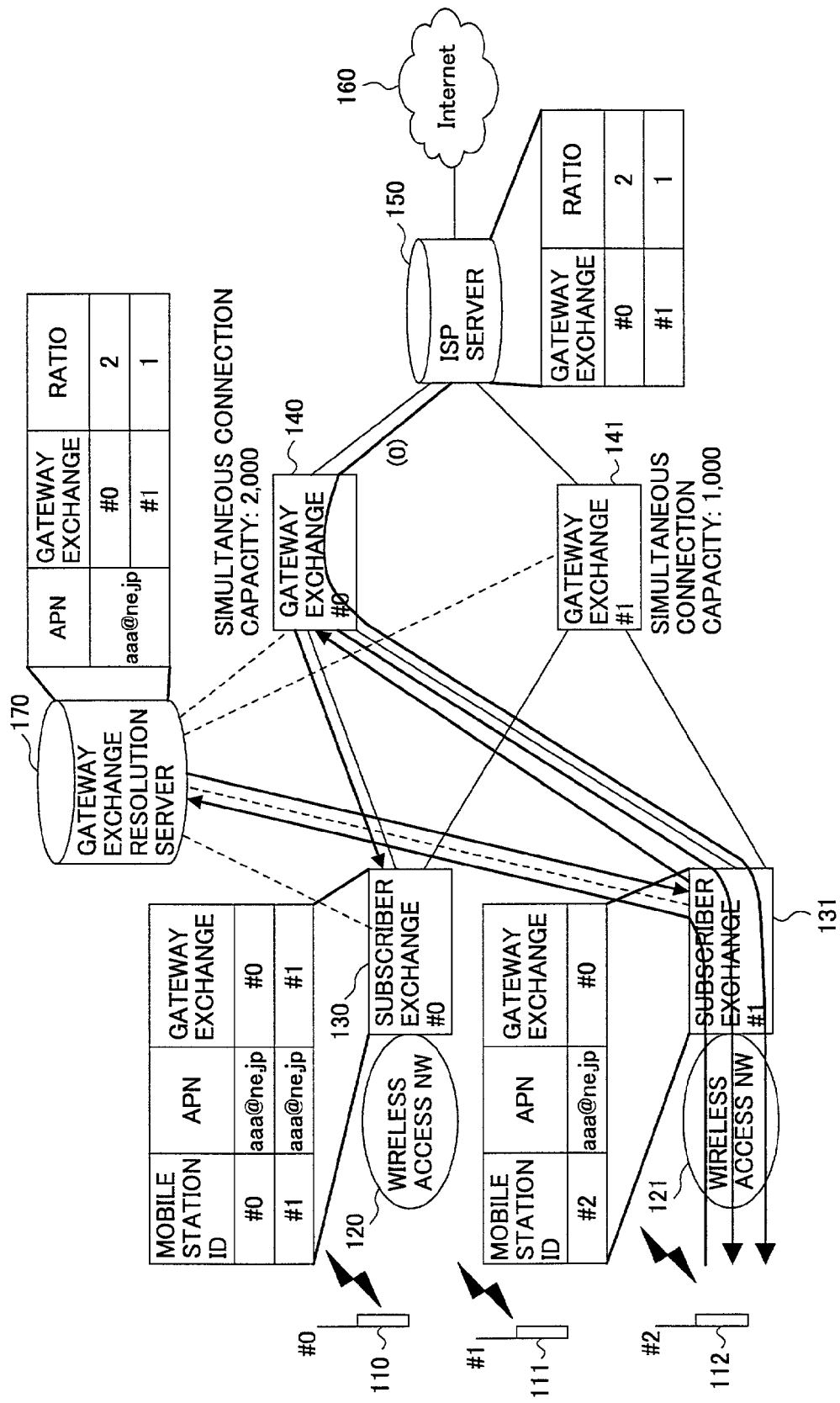
FIG. 12 shows an example of an incoming procedure when the synchronous round robin method is adopted.

FIG. 12 shows an example of an incoming procedure when the synchronous round robin method is adopted. The ISP server 150 sends a predetermined signal when originating a call (step 0) according to selection ratio 2:1 of the gateway exchange (#0) 140 and the gateway exchange (#1) 141 which are recognized beforehand. It is not necessary that the ISP server knows beforehand the selection ratio of the gateway exchanges (#0) 140 and (#1) 141 and sends the predetermined signal according to the selection ratio. Instead, the ISP server 150 may send the predetermined signal to the gateway exchange (#0) 140 and the gateway exchange (#1) 141 as necessary.

This predetermined signal includes APN of the ISP server 150. The gateway exchange (#0) 140 or (#1) 141 sends the received predetermined signal to one of the mobile stations (#0) 110–(#2) 112 which is a communication partner of the ISP server 150 via the subscriber exchange (#0) 130.

The mobile station which received the predetermined signal sends a signal including APN included in the predetermined signal to the gateway exchange resolution server 170. Procedure hereinafter is the same as the steps 1–5 in the origination procedure shown in FIG. 11.

When the ISP server 150 manages the mobile station ID and the IP address assigned to the mobile station, the ISP server 150 sends the mobile station ID and the IP address assigned to the mobile station to the gateway exchange (#1) 141 after detecting a failure. When the ISP server 150 does not manage the mobile station ID and the IP address assigned to the mobile station, the gateway exchange (#0)

140 sends the mobile station ID and the IP address assigned to the mobile station to the gateway exchange (#1) 141. When the ISP server 150 manages only the mobile station ID, since it is necessary to assign IP address to the mobile station, the ISP server 150 may send a signal including the IP address assigned to the mobile station to the mobile station for setting the IP address again.

The procedure for communication path switching at the time of occurrence of a failure when using the synchronous round robin method is the same as that for the asynchronous round robin method shown in FIGS. 9 and 10.

As mentioned above, according to the mobile communication system, a gateway exchange is selected according to states of a plurality of paths reaching from the subscriber exchange to the information providing server via each gateway exchange by using the representative selection method, asynchronous round robin method or synchronous round robin method. Therefore, the mobile station can obtain information even when a failure occurs in a path in the plurality of paths.

In the embodiments, although the ISP server 150 is used as the information providing server, the present invention also can be applied to the other servers such as a server in an intracorporate LAN.

The present invention is not limited to the specifically disclosed embodiments, and variations and modifications may be made without departing from the scope of the invention.

What is claimed is:

1. A mobile communication system comprising:
   a subscriber exchange to which a mobile station is operably linked;
   an information providing server which provides information to said mobile station;
   a plurality of gateway exchanges on transmission paths between said subscriber exchange and said information providing server, each of said gateway exchanges is connected to said information providing server by a dedicated line;
   a gateway exchange selection server; said gateway exchange selection server comprising:
   a gateway exchange selection part configured to select a gateway exchange configured to communicate between said mobile station and said information providing server;
   a gateway exchange selection result notification part configured to notify said subscriber exchange of a result of selection performed by said gateway exchange selection part;
   said subscriber exchange comprising:
   a communication path establishing part configured to establish a communication path between said subscriber exchange and a gateway exchange which is selected by said gateway exchange selection part; and
   wherein communication between said mobile station and said information providing server is performed via said gateway exchange selected by said gateway exchange selection part.

2. The mobile communication system as claimed in claim 1, wherein said gateway exchange selection server further comprises:
   a failure detection part configured to detect a failure on said transmission path connecting said subscriber exchange and said information providing server via said gateway exchange;
   wherein said gateway exchange selection part selects a gateway exchange other than a gateway exchange on a transmission path on which said failure is detected.

3. The mobile communication system as claimed in claim 1, wherein said gateway exchange selection server further comprises:
   a gateway exchange selection ratio setting part configured to set a selection ratio for said gateway exchanges;
   wherein said gateway exchange selection part selects said gateway exchange according to said selection ratio.

4. The mobile communication system as claimed in claim 2, wherein said gateway exchange selection server further comprises:
   a gateway exchange selection ratio setting part configured to set a selection ratio for said gateway exchanges;
   wherein said gateway exchange selection part selects said gateway exchange according to said selection ratio.

5. The mobile communication system as claimed in claim 3, wherein said selection ratio is a ratio of communication available capacities of said gateway exchanges.

6. The mobile communication system as claimed in claim 3, wherein said selection ratio is a ratio of differences each of which is a difference between a communication available capacity and a communication capacity in use for a gateway exchange.

7. A gateway exchange selection server in a mobile communication system including: a subscriber exchange to which a mobile station is connected, an information providing server which provides information to said mobile station, and a plurality of gateway exchanges on transmission paths between said subscriber exchange and said information providing server, each of said gateway exchanges is connected to said information providing server by a dedicated line, said gateway exchange selection server comprising:
   a gateway exchange selection part configured to select an gateway exchange used for communication between said mobile station and said information providing server;
   a gateway exchange selection result notification part configured to notify said subscriber exchange of a result of selection performed by said gateway exchange selection part;
   wherein a communication path is established between said subscriber exchange and a gateway exchange which is selected by said gateway exchange selection part.

8. The gateway exchange selection server as claimed in claim 7, further comprising:
   a failure detection part configured to detect a failure on said transmission path connecting said subscriber exchange and said information providing server via said gateway exchange;
   wherein said gateway exchange selection part selects a gateway exchange other than a gateway exchange on a transmission path on which said failure is detected.

9. The gateway exchange selection server as claimed in claim 7, further comprising:
   a gateway exchange selection ratio setting part configured to set a selection ratio for said gateway exchanges;
   wherein said gateway exchange selection part selects said gateway exchange according to said selection ratio.

10. The gateway exchange selection server as claimed in claim 8, further comprising:
    a gateway exchange selection ratio setting part configured to set a selection ratio for said gateway exchanges;

wherein said gateway exchange selection part selects said gateway exchange according to said selection ratio.

11. The gateway exchange selection server as claimed in claim 9, wherein said selection ratio is a ratio of communication available capacities of said gateway exchanges.

12. The gateway exchange selection server as claimed in claim 9, wherein said selection ratio is a ratio of differences each of which is a difference between a communication available capacity and a communication capacity in use for a gateway exchange.

13. A gateway exchange selection method used in a mobile communication system including a subscriber exchange to which a mobile station is operably linked, an information providing server which provides information to said mobile station, and a plurality of gateway exchanges on transmission paths between said subscriber exchange and said information providing server, each of said gateway exchanges is connected to said information providing server by a dedicated line, said method comprising:

selecting an gateway exchange used for communication between said mobile station and said information providing server;

notifying the subscriber exchange of a result of the selection establishing a communication path between said subscriber exchange and a gateway exchange which is selected; and wherein communication between said mobile station and said information providing server is performed via said gateway exchange which is selected.

14. The gateway exchange selection method as claimed in claim 13, further comprising:

detecting a failure on said transmission path connecting said subscriber exchange and said information providing server via said gateway exchange;

wherein a gateway exchange other than a gateway exchange on a transmission path on which said failure is detected is selected.

15. The gateway exchange selection method as claimed in claim 13, further comprising:

setting a selection ratio for said gateway exchanges;

wherein said gateway exchange is selected according to said selection ratio.

16. The gateway exchange selection method as claimed in claim 14, further comprising:

setting a selection ratio for said gateway exchanges;

wherein said gateway exchange is selected according to said selection ratio.

17. The gateway exchange selection method as claimed in claim 15, wherein said selection ratio is a ratio of communication available capacities of said gateway exchanges.

18. The gateway exchange selection method as claimed in claim 15, wherein said selection ratio is a ratio of differences each of which is a difference between a communication available capacity and a communication capacity in use for a gateway exchange.

* * * * *